United States Patent [19]

Phillips

[11] Patent Number: 5,977,263
[45] Date of Patent: Nov. 2, 1999

[54] THERMAL TRANSFER COMPOSITIONS, ARTICLES AND GRAPHIC ARTICLES MADE WITH SAME

[75] Inventor: Nancy H. Phillips, Shoreview, Minn.

[73] Assignee: 3M Innovative Properties Company, St. Paul, Minn.

[21] Appl. No.: 08/687,312

[22] Filed: Jul. 25, 1996

Related U.S. Application Data

[63] Continuation-in-part of application No. 08/506,926, Jul. 26, 1995, abandoned, which is a continuation-in-part of application No. 08/280,467, Jul. 26, 1994, abandoned, which is a continuation-in-part of application No. 07/988,759, Dec. 10, 1992, Pat. No. 5,468,532.

[51] Int. Cl.$^6$ .............................. C08F 8/30; C08F 20/02; C08F 20/62; C08F 120/02
[52] U.S. Cl. .................................. 525/329.9; 525/329.7; 428/40; 428/334; 428/423.3; 428/424.2; 428/424.8; 428/354; 428/480; 428/483
[58] Field of Search ....................... 428/40, 334, 423.3, 428/423.7, 424.8, 354, 480, 483; 525/329.7, 329.9

[56] References Cited

U.S. PATENT DOCUMENTS

| | | | |
|---|---|---|---|
| 2,407,680 | 9/1946 | Palmquist et al. | 88/82 |
| 3,190,178 | 6/1965 | McKenzie | 88/82 |
| 3,681,515 | 8/1972 | Mildner | 174/107 |
| 3,712,706 | 1/1973 | Stamm | 350/103 |
| 3,770,479 | 11/1973 | Dunning | 117/3.4 |
| 3,795,540 | 3/1974 | Mildner | 117/226 |
| 3,938,992 | 2/1976 | Jadwin et al. | 96/1 SD |
| 3,953,635 | 4/1976 | Dunning | 428/151 |
| 4,001,159 | 1/1977 | Imal et al. | 260/29.6 |
| 4,025,159 | 5/1977 | McGrath | 350/105 |
| 4,084,032 | 4/1978 | Pasersky | 428/172 |
| 4,139,514 | 2/1979 | Bassett | 260/29.6 |
| 4,214,028 | 7/1980 | Shortway et al. | 428/159 |
| 4,243,618 | 1/1981 | Van Arnam | 264/1 |
| 4,349,598 | 9/1982 | White | 428/161 |
| 4,384,065 | 5/1983 | Wong | 524/322 |
| 4,513,107 | 4/1985 | Fabbrini | 524/56 |
| 4,542,078 | 9/1985 | Fitzer et al. | 428/914 |
| 4,565,842 | 1/1986 | Fitzer et al. | 524/57 |
| 4,588,258 | 5/1986 | Hoopman | 350/103 |
| 4,600,628 | 7/1986 | Ishii et al. | 428/427 |
| 4,605,592 | 8/1986 | Paquette et al. | 428/334 |
| 4,664,966 | 5/1987 | Bailey et al. | 428/203 |
| 4,737,224 | 4/1988 | Fitzer et al. | 156/240 |
| 4,762,875 | 8/1988 | Gold | 524/248 |
| 4,767,659 | 8/1988 | Bailey et al. | 428/203 |
| 4,775,219 | 10/1988 | Appeldorn et al. | 350/103 |
| 4,786,537 | 11/1988 | Sasaki | 428/40 |
| 4,889,765 | 12/1989 | Wallace | 428/290 |
| 4,895,428 | 1/1990 | Nelson et al. | 350/103 |
| 4,896,943 | 1/1990 | Tolliver et al. | 350/105 |
| 4,908,063 | 3/1990 | Baker et al. | 106/31 |
| 4,919,994 | 4/1990 | Incremona et al. | 428/141 |
| 4,954,556 | 9/1990 | Bull et al. | 524/378 |
| 4,973,617 | 11/1990 | Incostro et al. | 524/187 |
| 4,980,408 | 12/1990 | Chan | 524/504 |
| 4,983,436 | 1/1991 | Bailey et al. | 428/40 |
| 5,034,275 | 7/1991 | Pearson et al. | 428/336 |
| 5,037,447 | 8/1991 | Nishimoto et al. | 8/467 |
| 5,037,680 | 8/1991 | Papendick et al. | 428/31 |
| 5,066,098 | 11/1991 | Kult et al. | 359/540 |
| 5,098,478 | 3/1992 | Krishnan et al. | 106/23 |
| 5,378,520 | 1/1995 | Nagaoka et al. | 428/327 |
| 5,393,950 | 2/1995 | Killian | 219/110 |
| 5,468,532 | 11/1995 | Ho et al. | 428/40 |

FOREIGN PATENT DOCUMENTS

| | | |
|---|---|---|
| 0 222 240 A2 | 5/1987 | European Pat. Off. . |
| 0 266 109 | 5/1988 | European Pat. Off. . |
| 0 410 724 A2 | 7/1990 | European Pat. Off. . |
| 2074434 | 3/1990 | Japan . |
| 1 218 058 | 1/1971 | United Kingdom . |
| WO 85/01052 | 3/1985 | WIPO . |
| WO 92/20534 | 11/1992 | WIPO . |
| WO 94/13496 | 6/1994 | WIPO . |
| WO 95/02515 | 1/1995 | WIPO . |

Primary Examiner—Lynette F. Smith
Assistant Examiner—Datquan Lee
Attorney, Agent, or Firm—Robert H. Jordan

[57] ABSTRACT

Thermal transfer articles of the invention comprising a carrier, optionally a release layer, a color layer releaseably adhered thereto, and optionally an adherence layer on the bottom side of the color layer. Also methods for thermal transfer using such articles and signage made by such methods. The transfer articles of the invention 1) exhibit thermoplastic, low cohesive properties during transfer such that good image resolution and transfer is achieved and 2) are thermally crosslinked such that a durable image is formed.

7 Claims, 2 Drawing Sheets

THERMAL TRANSFER COMPOSITIONS, ARTICLES AND GRAPHIC ARTICLES MADE WITH SAME

CROSS-REFERENCE TO RELATED APPLICATIONS

This application is a continuation-in-part of U.S. application Ser. No. 08/506,926 filed Jul. 26, 1995, now abandoned, which application was a continuation-in-part of U.S. Ser. No. 08/280,467, filed Jul. 26, 1994, now abandoned, which application was a continuation-in-part of U.S. application Ser. No. 07/988,759, filed Dec. 10, 1992, now U.S. Pat. No. 5,468,532. This application claims priority from U.S. application Ser. No. 08/280,467, filed Jul. 26, 1994.

BACKGROUND OF THE INVENTION

1. Field of the Invention

In general, this invention relates to compositions and articles suitable for use in thermal transfer imaging processes, and also relates to graphic articles comprising a graphic image formed using the inventive compositions and articles, and methods of making such graphic articles.

2. Related Art

Multilayer graphic articles may be applied to a variety of surfaces for decorative, informational, and/or functional reasons. These multilayer constructions often contain one or more continuous or non-continuous color layers which have been thermally transferred from a carrier film, or coated, printed, or laminated onto a substrate.

Decorative graphic articles are typically highly contrasting polychromatic constructions that enhance the visual appeal of surfaces to which they are applied, such as motor vehicles, marine craft, commercial or residential real estate, signs, store displays and the like. Informational graphic articles provide directions, location indicia, instructions, and identification when used, for example, to construct road signs and license plates. Functional graphic articles impart weather protection and wear resistance to surfaces to which they are applied, especially outdoor surfaces.

Color layers in presently known graphic articles often contain a poly(vinylchloride) ("PVC") binder blended with various color agents, volatile organic solvents, and plasticizers. PVC binders, which typically make up 30 to 50 weight percent of a color layer formulation, are not considered to be environmentally friendly. Volatile organic solvents typically provide 40 to 60 weight percent of a formulation. For various environmental and health reasons, the reduction or elimination of these solvents is desirable. Reduction or elimination of the use of PVC plasticizers is also desirable. Plasticizers can migrate in adjacent layers of the graphic article and cause visual changes to both the color layer and surrounding members which could adversely affect the stability of the color layer or appearance of the graphic article.

Presently known color layer formulations are compatible with only a limited class of substrates, primarily PVC, acrylics, and urethanes. These substrates can have poor flexibility and PVC is not environmentally desirable.

Accordingly, a substantial need exists for eliminating or reducing the use of PVC-based materials (and their associated solvents and plasticizers) in both color layer formulations and graphic articles, and in articles and methods used for their production, e.g., donor elements such as thermal transfer ribbons and hot stamp foils.

It has long been known to provide retroreflective articles with cover films (for example, made of polymethylmethacrylate, polyvinylchloride, polyester, etc.) to improve the retroreflective performance which is provided under wet conditions and to protect the retroreflective elements. See, for example, U.S. Pat. Nos. 2,407,680 (Palmquist et al.), 3,190,178 (McKenzie), and 4,025,159 (McGrath). To achieve improved durability, embossability, and abrasion resistance, improved retroreflective sheetings with new selections of materials for cover films are now known, e.g., including ethylene/acrylic acid copolymers as disclosed in U.S. Pat. Nos. 4,664,966 (Bailey et al.), 4,767,659 (Bailey et al.), 4,896,943 (Tolliver et al.), and 5,066,098 (Kult et al.). A common problem with such cover film materials is that in order to achieve satisfactory adhesion of imaging materials thereto, such as is used to print legends on and/or color the retroreflective article, surface priming layers and/or techniques must be employed. The need exists for ink formulations and thermal transfer articles, e.g., thermal transfer ribbons and hot stamp foils, having color layers that can be readily and easily applied to such cover films without using priming layers or techniques.

It is well known that graphic articles can be prepared by imagewise transfer of color layers by application of heat and/or pressure. Two examples of this are the "hot stamp" application, and thermal mass transfer. A limitation of typical thermal transfer color layers is the poor durability resulting from the low cohesive strength necessary to perform distinct imagewise transfer.

A need exists for improving the durability of images formed by thermal transfer methods.

One known method described in U.S. Pat. No. 5,037,447 (Nishimoto et al.) involves using a chemical agent to treat the image after it has been transferred to the receptor substrate. While useful in its ability to improve the cohesive strength and resulting durability of the material, this method is limited by the requirement of using a potentially irritating and messy chemical agent.

It is known to form graphic patterns on substrates using transfer articles bearing predesignated designs. G.B. Patent No. 1,218,058 (Hurst et al.) discloses transfers with an adhesive layer applied to only those areas intended to be transferred to the substrate; U.S. Pat. Nos. 4,786,537 (Sasaki) and 4,919,994 (Incremona et al.) disclose transfer graphic articles wherein the graphic design is formed via imagewise differential properties within the transfer film itself. One problem with such approaches is that a large and varied inventory must be maintained in order to provide a variety of graphic patterns.

Hot stamping foils comprising a carrier, one or more color layers, and an adherence layer have been known for some time. Such films have been used to provide imagewise graphic patterns, e.g., alphanumeric or decorative legends, to substrates via imagewise application of heat and/or contact or pressure. In some embodiments, additional members such as release layers are used to facilitate desired performance. In some embodiments, so-called "texture layers" and/or "ticks", metal layers, etc. are used as well to yield desired appearance. Hot stamping foils are also sometimes called hot stamp tapes or thermal transfer tapes. Other related thermal mass transfer methods are known, e.g., using thermal transfer ribbons comprising a carrier releasably bonded to a color layer that is thermally transferred to a desired substrate.

The color layer(s), adherence layer (if any), and any other layers (if any) of the thermal transfer element that are to be selectively applied to the substrate should split or fracture in desired manner in order for the applied graphic pattern to have a desired edge appearance. Some illustrative examples of previously known hot stamping foils are disclosed in U.S. Pat. Nos. 3,770,479 (Dunning) 3,953,635 (Dunning), and 4,084,032 (Pasersky).

An advantage of the foregoing techniques is that the transfer film may be made as a uniform sheet, i.e., with no specific latent image embodied therein. The applicator defines the graphic pattern by controlling the application process, e.g., imagewise application of heat and/or contact pressure. This permits maintenance of a smaller inventory of thermal transfer element material.

One well known use of hot stamping foils is to print legends on vehicle identification plates. For example, license plates produced using hot stamping foils have been used in Austria, Australia, Finland, Germany, Ireland, Portugal, and Switzerland. One commercially available hot stamping foil currently used on license plates with polyvinyl chloride cover films is believed to comprise a polyester carrier, about 28 microns thick; a color layer based on acrylic resins such as polymethyl methacrylate and containing carbon black pigments, about 5 microns thick; and an acrylate-based adherence layer, about 5 microns thick. Examples of resins that are believed to have been used in adherence layers include polyvinyl alcohol copolymers, nitrocellulose, and methyl methacrylate/butyl methacrylate copolymers.

Recently improved retroreflective sheetings have been made available which have cover films made of olefin-based materials or polyurethane-based materials to improve certain performance. As disclosed in the aforementioned U.S. Pat. No. 4,896,943 (Tolliver et al.), olefin-based cover films, e.g., ethylene/acrylic acid copolymers, can provide superior properties including abrasion and dirt resistance. Many conventional hot stamping foils do not achieve good adherence to such cover sheets, however, resulting in graphic patterns having unsatisfactory durability and performance.

More recently, U.S. Pat. No. 5,393,950 (Caspari) discloses hot stamping foils well suited for use on retroreflective articles wherein the foils comprise a carrier, optionally a release control layer, a color layer, and an adherence layer wherein the adherence layer comprises, and may consist essentially of, a mixture of an ethylene copolymer dispersion and an acrylic dispersion.

The need exists for improved thermal transfer articles which can be used to form durable graphic patterns on such cover sheets and a method for forming such graphic patterns.

SUMMARY OF THE INVENTION

The present invention provides novel thermal transfer articles and novel graphic articles made using compositions that provide surprising utility, and methods for their production. Retroreflective graphic articles of the invention exhibit good exterior durability, abrasion resistance, flexibility if desired, clear, legible graphics, uniform color and appearance (i.e., are substantially free of streaking and blotching), and consistent color under both ordinary diffuse lighting conditions and retroreflective conditions if desired. As used herein the term "graphic article" refers to a retroreflective signage article, whereas the term "thermal transfer article" refers to an article having a thermally transferable color layer thereon, the transferable color layer derived from the compositions described herein.

Another aspect of the invention is a coatable, latently thermally crosslinkable thermoplastic composition. An illustrative example of such a composition is:

a) a dispersion of copolymer with the general formula:

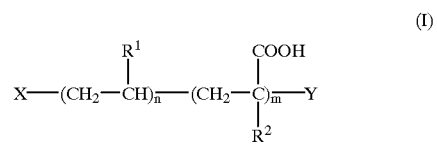

wherein $R^1$ is selected from the group consisting of H and alkyl groups containing one to eight carbon atoms; $R^2$ is selected from the group consisting of H, alkyl groups containing one to six carbon atoms, —CN, ester groups and $R^3$—COOH, wherein $R^3$ is any alkyl group, e.g., containing one to eight carbon atoms; X and Y are independently selected from the group consisting of a residue of the first ethylenically unsaturated monomer and a residue of the second ethylenically unsaturated monomer; n is a positive integer selected such that the first ethylenically unsaturated monomer provides from about 70 to 99 mole percent (48 to 97 weight percent) of the copolymer; and m is a positive integer selected such that the second ethylenically unsaturated monomer correspondingly provides from about 1 to 30 mole-percent (2 to 52 weight percent) of the copolymer.

The compositions of the invention also include a thermally activated crosslinking agent. The copolymer optionally comprises an ethylene copolymer, more preferably ethylene/acrylic acid copolymer.

In brief summary, retroreflective graphic articles of the invention comprise a retroreflective base sheet and at least one color layer disposed in the effective optical path of the base sheet. The base sheet may be an optically complete retroreflective construction, e.g., a sheet of high intensity sheeting, or may be an optically incomplete construction that needs an additional component in order to be retroreflective. In either instance, however, the color layer is disposed in the article so as to be in the path of light which is retroreflected by the resultant article. The color layer comprises a color agent and a crosslinking agent in a copolymeric binder.

Broadly, the binder comprises the copolymerization product of an olefinic monomer (preferably ethylene) and a second monomer having a pendant carboxyl group (preferably acrylic or methacrylic acid). The first monomer provides from 99 to 70 mole percent (more preferably, 75 to 85 mole percent) while the second monomer correspondingly provides from 1 to 30 mole percent (more preferably from 15 to 25 mole percent) of the binder. The copolymeric binder also comprises a suitable crosslinking agent such as a melamine formaldehyde resin. The copolymeric binder may be supplemented with a secondary binder such as an acrylic, styrenated acrylic, or urethane polymer.

Numerous color agents are useful within the scope of the invention including organic pigments, inorganic pigments, metallic (for example, aluminum) flakes, glass flakes, pearlescent materials, and dyes.

Retroreflective graphic articles of the invention may include multiple color layers each of which may be continuous or discontinuous relative to the substrate on which it is disposed and any other color layers in the graphic article. Such constructions are particularly preferred for providing multicolored graphic articles.

Retroreflective graphic articles of the invention may be applied to a wide variety of substrates including motor vehicles, marine craft, snowmobiles, sign faces and the like.

Another aspect of the invention is a thermal transfer article (e.g., a thermal mass transfer ribbon or hot stamp foils) useful in producing graphic articles of the invention, the thermal transfer articles comprising a carrier having at least one major surface, the major surface having a color layer removably adhered thereto, wherein the color layer comprises the color layer described herein. Thermal transfer articles of the invention comprise a crosslinking resin adapted to crosslink the copolymer of the color layer either during, or more preferably, after thermal transfer of the color layer to a retroreflective substrate. A illustrative crosslinking material is a melamine formaldehyde resin.

Another aspect of the invention is a method of making a retroreflective graphic article, the method comprising the steps of:

(a) selecting a thermal transfer article of the invention, comprising a crosslinking resin in the color layer;

(b) selecting a retroreflective substrate (i.e., either a substrate that is retroreflective or a component that is to be incorporated into a retroreflective article); and (c) contacting the color layer of the thermal transfer article to the retroreflective substrate under sufficient heat and pressure to transfer at least a portion of the color layer to the retroreflective sheeting. In some embodiments the method includes (d) further treating, e.g., via heating, the product of step (c) to crosslink the copolymer within general formula (I) with the crosslinking resin.

BRIEF DESCRIPTION OF THE DRAWINGS

The invention will be more fully explained with reference to the following drawings in which similar reference numerals designate like or analogous components throughout and in which.

These Figures, which are idealized, are not to scale and are intended to be merely illustrative and non-limiting.

DESCRIPTION OF ILLUSTRATIVE EMBODIMENTS

Figure 1:
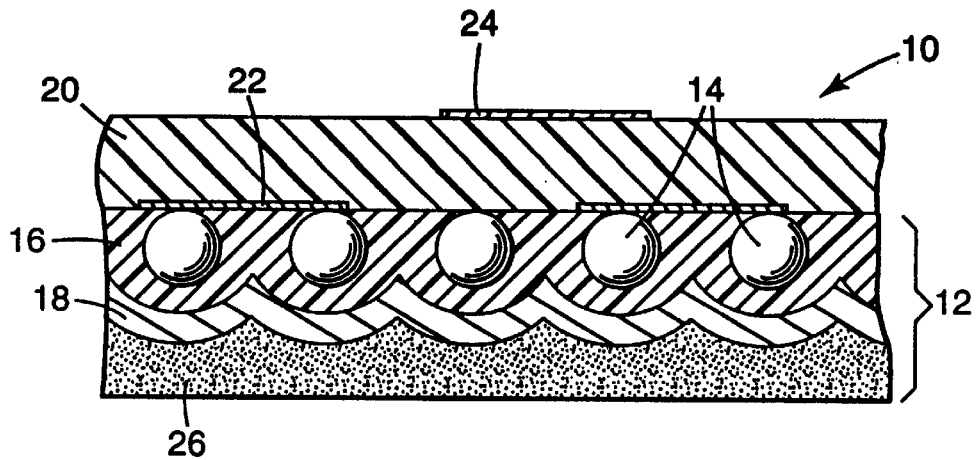
FIG. 1 is a cross-sectional view of a portion of an embedded-lens embodiment of retroreflective sheeting of the invention.

An illustrative retroreflective graphic article embodiment of the invention is illustrated in FIG. 1 wherein article 10 comprises retroreflective base sheet 12 comprising a monolayer of elements 14 embedded in binder layer 16 with underlying reflecting layer 18. such retroreflective base sheets are well-known and disclosed in, for example, U.S. Pat. Nos. 4,664,966 and 4,983,436 (both Bailey et al.). Illustrative examples of materials used in such binder layers include polyvinyl butyral and urethane-extended polyester. Sheeting 10 also comprises transparent cover film 20 on the front side of base sheet 12 and is illustrated with graphic pattern 22 disposed on the front surface of base sheet 12 between the base sheet and cover film 20 and graphic pattern 24 on the outside surface of cover film 20. Illustrative examples of materials used in cover films of such constructions include ethylene acrylic acid copolymers, polyvinyl chlorides, and alkyds. It has been found that thermally transferable color layers of the invention can achieve high adhesion to polyvinyl butyral and ethylene/acrylic acid copolymer layers without the use of corona treatment or other adhesion promoting priming steps. Sheeting 10 also comprises optional adhesive layer 26.

Figure 2:
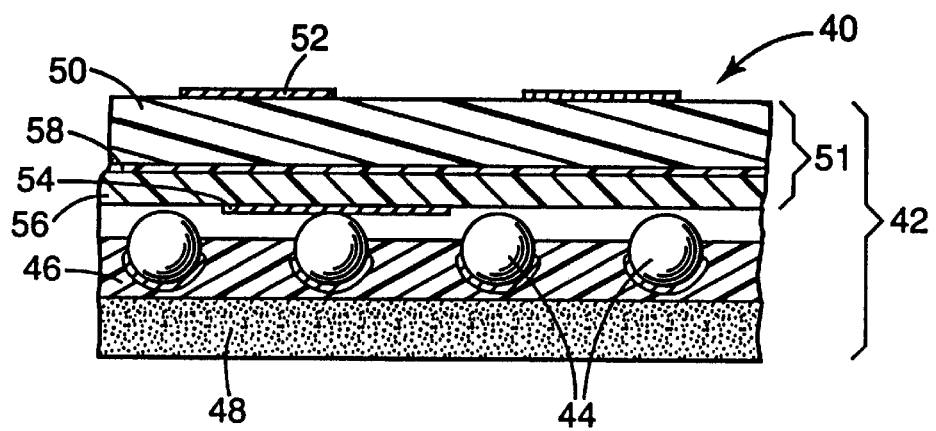
FIG. 2 is a cross-sectional view of a portion of an encapsulated-lens, microsphere-based embodiment of retroreflective sheeting of the invention.

Another embodiment of a retroreflective sheeting of the invention is illustrated in FIG. 2 wherein article 40 comprises encapsulated-lens retroreflective base sheet 42 comprising a monolayer of retroreflective elements 44 (each comprising a glass microsphere with an aluminum reflective layer on the back side thereof) partially embedded in binder layer 46 with optional layer of adhesive 48 on the back side thereof. Sheet 42 also comprises cover film 51 disposed in front of retroreflective elements 44 such that they have an air-interface, typically sealed to the rest of sheet 42 with a pattern of intersecting bonds (not shown). A number of encapsulated-lens retroreflective sheetings are well-known, see for example, U.S. Pat. Nos. 4,025,159 (McGrath), 4,896,943 (Tolliver et al.), and 5,066,098 (Kult et al.). Illustrative examples of materials that may be used as cover films include polyethylene, polypropylene, copolymers of ethylene (e.g., ethylene/acrylic acid copolymer), polymethylmethacrylates, etc. In accordance with the present invention, sheeting 40 is illustrated with optional graphic pattern 52 disposed on the front surface of cover film 51, optional graphic pattern 54 on the inner surface of cover film 51, and optional color layer 58 within the structure of cover film 51.

Cover film 51 in the embodiment illustrated is one such as is disclosed in U.S. Pat. No. 5,066,098 wherein cover film 51 is made up of main layer 50 and secondary layer 56. In accordance with the invention disclosed in that patent, secondary layer 56 comprises material which will resist intrusion or embedment of microspheres 44 during sealing such that a resultant sheeting with higher whiteness (or truer color if binder layer 56 is of another color), e.g., the softening point of secondary layer 56 is higher than that of main layer 50. In illustrative embodiments, main layer 50 comprises one or more homopolymers of ethylene or propylene, copolymers comprising a major portion by weight of at least one of ethylene or propylene and a minor portion by weight of at least one comonomer, e.g., acrylic acid, methacrylic acid, vinyl acetate, urethane, nylon, etc.; secondary layer 56 comprises one or more of PERMUTHANE™ U26-248 thermoplastic polyurethane from Stahl USA, NEOREZ™ Urethane Dispersion, NEOCRYL™ Acrylic Dispersion, polyolefin polymers with higher Vicat Softening Points than the main layer, vinyls, polyesters, etc.; and binder layer 44 comprises a thermoplastic urethane binder, e.g., Q-THANE™ P3429 Urethane Resin. Cover film 51 might further comprise a prime layer (not illustrated) on its outer surface. An advantage of the thermally transferable color layers of the present invention is that such prime layers are not necessary. Cover film 51 is illustrated with color layer 58, made in accordance with the present invention, which can be substantially continuous as illustrated or may be in imagewise graphic pattern if desired. An advantage of the present invention is that if color layer 58 is continuous, it will provide delamination resistant bonding to both main layer 50 and secondary layer 56. Such embodiments of the invention have exhibited superior delamination resistance as compared to similar article not having color layer 58.

Figure 3:
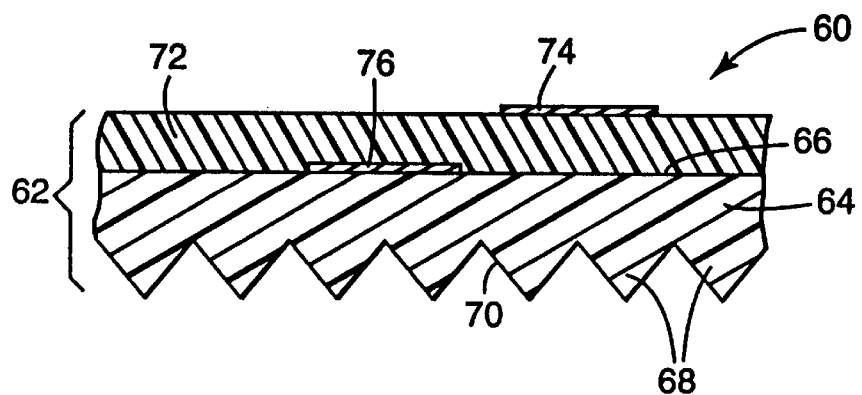
FIG. 3 is a cross-sectional view of a portion of a cube-corner-based embodiment of retroreflective sheeting of the invention.

Another embodiment of a retroreflective sheeting of the invention is illustrated in FIG. 3 wherein article 60 comprises cube-corner type retroreflective base sheet 62 which comprises sheet 64 with flat front surface 66 and a plurality of cube-corner elements 68 protruding from rear surface 70 thereof. Base sheet 62 also comprises optional abrasion resistant cover sheet 72 on the front surface thereof. Illustrative cube-corner type retroreflectors are disclosed in U.S. Pat. Nos. 3,712,706 (Stamm), 4,243,618 (Van Arnam), 4,349,598 (White), 4,588,258 (Hoopman), 4,775,219 (Appeldorn et al.), and 4,895,428 (Nelson et al.). In accordance with the invention, sheeting 60 comprises exposed graphic pattern 74 on the outside or front surface of cover sheet 72 and embedded graphic pattern 76 on the rear surface of cover sheet 72, i.e., between cover sheet 72 and sheet 64. Typically, cube-corner elements 68 will be encapsulated (not shown), such as is disclosed in U.S. Pat. No. 4,025,159 (McGrath).

In each of the graphic article embodiments illustrated, a graphic pattern is provided in the "effective optical path" of the retroreflective base sheet. As described above, the base sheet may be an optically complete retroreflective construction, i.e., a sheet of high intensity sheeting, e.g., base sheet 42 in FIG. 2, or may be an optically incomplete construction that needs an additional component in order to be retroreflective, e.g., base sheet 12 in FIG. 1. In either instance the color layer is disposed in the article so as to be in the path of light which is retroreflected by the resultant article. By "effective optical path" it is meant that the graphic pattern lies within the path taken by incident light that is retroreflected by the resultant article. In this manner, the graphic pattern imparts desired color to the light that is retroreflected.

One of the advantages of the present invention is that the compositions discussed herein (and the thermal transfer articles provided herein that are produced using same) can be used to provide color layers and graphic patterns on retroreflective sheetings without using primers. For instance, when applied to ethylene/acrylic acid cover films, the vinyl-based, solvent-borne inks that are currently typically used with retroreflective sheetings typically require priming by application of special treatments or formation of additional layers. The present invention provides retroreflective sheets made without such prime treatments or layers. Another advantage is that inks of the invention (and the thermal transfer articles produced using same) can be used to provide highly transparent color layers which are necessary for good retroreflective performance.

In a broad embodiment of the invention, only one color layer need be provided. However, in many preferred graphic articles, more than one color layer is desirable, especially where a multicolored graphic article is sought. A graphic pattern may be continuous and cover substantially the entirety of the retroreflective article or be discontinuous and cover only a portion of it in an imagewise manner as desired. If desired, more than one color layer may be provided in a graphic article or thermal transfer article of the invention, with layers being overlapping in some areas to achieve additive color effects or being substantially non-overlapping as desired. When more than one color layer is used, the layer may have substantially the same formulation, perhaps with only the color agent component being changed as necessary to achieve the desired color, or the formulations may be varied. For instance, if a first color layer is to be exposed and a second color layer within the article is to be embedded, it may be desirable to optimize the formulation for the first layer to yield a layer that is more abrasion and weather resistant.

As desired, color layers in graphic articles of the invention may be very thin, e.g., a dry thickness of less than about 2.5 microns (0.1 mil), or thick, e.g., a dry thickness of between about 10 to 50 microns (0.5 to 2.0 mils) for example.

Color layers useful in the invention may be provided by a solution, emulsion or dispersion comprising a binder, a color agent, a crosslinking agent, and various optional ingredients, which is coated onto a removable carrier to produce a thermal transfer article of the invention. The binder includes in major portion a polymeric material with hot melt adhesive properties.

A preferred class of material comprises the copolymerization product of an olefinic monomer and a second monomer containing a pendant carboxyl group. Illustrative copolymeric binders have the following general formula:

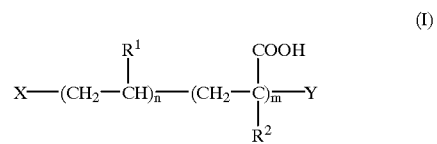

(I)

wherein $R^1$ is either H or an alkyl group containing one to eight carbon atoms; $R^2$ is (1) H, (2) an alkyl group containing one to six carbon atoms, (3) —CN, (4) an ester group, or (5) —$R^3$—COOH, wherein $R^3$ is any alkyl group, e.g., typically containing one to eight carbon atoms; X and Y are independently a residue of the olefinic monomer or a residue of the second monomer; n is a number selected such that the olefinic monomer provides from about 70 to 99 mole percent of the copolymeric binder; and m is a number selected such that the second monomer correspondingly provides from about 1 to 30 mole percent of the copolymeric binder.

The most preferred copolymeric binders are ethylene acrylic acid and ethylene methacrylic acid copolymers as they impart very useful combinations of flexibility, film strength, and adhesion to resultant color layers. In these materials, the ethylene monomer preferably provides from about 85 to 95 mole percent of the binder while the acrylic acid or methacrylic acid monomer (as the case may be) correspondingly provides from about 5 to 15 mole percent.

Illustrative examples of suitable commercially available copolymeric binders include ADCOTE™-50T4983 having approximately 20 weight percent (9 mole percent) acrylic acid and a melt index of 300, ADCOTE™-50T4990 having 20 weight percent acrylic acid (9 mole percent) and a melt index of 1300, and ADCOTE™-56220 having 13 weight percent (7.5 mole percent) methacrylic acid and a melt index of 60. Each of these materials is available from Morton International. Also useful is MICA™-927 having 20 weight percent acrylic acid (9 mole percent) and a melt index of 300, available from Mica Corp.

The commercially available copolymeric binders are typically provided as a salt in which the carboxylic acid functionality has been neutralized with a base so as to improve the aqueous dispersibility of the resin. Consequently, it will be understood that formula (I) above includes basic salts thereof. Useful bases for neutralizing the carboxylic acid functionality include ammonia and other amines. Sodium hydroxide and potassium hydroxide may also be used but are less preferred due to concerns of moisture sensitivity and non-evaporation of the metal ion.

The copolymeric binder may be blended or supplemented with an additional, secondary binder to improve the hardness, tensile strength, heat resistance, and/or environmental weather resistance of the color layer as well as its adhesion to the substrate on which it is disposed. Particularly useful in this regard are waterborne urethane, acrylic, and styrenated acrylic polymers, which form visibly homogenous blends with waterborne ethylene acrylic acid copolymers. By "visibly homogenous" it is meant that the blend appears homogenous and uniform to the eye. Typically this means it is homogenous with domains less than about 0.1 micron in size, or if there are domains larger than that size, the index of refraction of the domains is quite close to that of the surrounding material such that little or no discontinuity is visible. The formation of a visibly homogenous blend is important, as visibly non-homogenous polymer blends will not form a continuously transparent film as is necessary for the representation of retroreflective colors.

Optimally, the copolymeric binder is crosslinked after application of the color layer onto the retroreflective substrate, or after thermal transfer. By crosslinking the binder, various physical properties of the color layer can be beneficially influenced. For example, by controlling the amount of crosslinking, the wear resistance, dimensional stability (in response to changes in temperature and humidity), hot melt adhesive properties (e.g., melting temperature), tensile strength, adhesion, and heat resistance can be improved in some instances.

Useful covalent crosslinking agents typically comprise polyfunctional carbodiimides, epoxies, melamines, or mixtures of one or more of these agents. Melamine crosslinking agents typically require heating to somewhat higher temperatures.

The crosslinking agent is typically included at a level of from about 0 to 35 parts per 100 parts (phr) of the copolymeric binder, more preferably 0.05 to 10 phr, and most preferably 0.1 to 4.5 phr.

The color layer (both in thermal transfer articles of the invention and graphic articles of the invention) further comprises one or more color agents such organic or inorganic pigments or dyes, including white, black, and colored materials. If desired, the color agents may be fluorescent. Typically to be useful in a retroreflective application, the color layer should be transparent so the color is similar when viewed under either ordinary diffuse light conditions (e.g., under daylight) or under retroreflective conditions (e.g., at night time when illuminated by vehicle headlights). This typically requires pigments with a relatively narrow absorption band to yield a saturated color and pigment particles with an average refractive index of about 1.5 and an average diameter less than 1 micron in order to minimize light scattering. It will be understood by those skilled in the art that pigment particles outside this range may be used with satisfactory results in some instances. It is also preferred that the particle have an index of refraction that is close to that of the surrounding matrix so as to make any discontinuity less visible. Organic pigments are preferred especially when dispersed to a small particle size so as to minimize light scattering as light passes through the color layer. Dyes also reduce light scattering but generally exhibit a greater tendency to migrate in these materials and therefore are more suitable for applications with shorter lifetimes.

Pigments can be made dispersible in an aqueous system by milling the particles with a water dispersible polymeric binder or by milling and surface treating the particle with suitable polymeric surfactant. Pigments exhibiting the desired properties have been obtained using both types of dispersing systems.

Examples of suitable commercially available waterborne pigment dispersions include HEUCOSPERSE™ III Organic Pigments, believed to contain about 25 weight percent pigment, 25 weight percent styrenated acrylic as binder, and 50 weight percent water, from Heucotech, Ltd.; AQUIS II™ Organic Pigment, believed to contain about 45 weight percent pigment, 5 weight percent surfactant, and 50 weight percent water, from Heucotech, Ltd.; and SUNSPERSE™ 6000 Organic Pigment Dispersions, believed to typically contain about 45 weight percent pigment, 5 weight percent surfactant, and 50 weight percent water, from Sun Chemical Company.

Pigment particles in color layer compositions of the invention tend to act as fillers and reduce the cohesive strength of the film as the pigment loading is increased. Increasing pigment loading will tend to decrease the cohesive strength of the layer, making imagewise transfer from a thermal mass transfer element of the invention easier, but also tending to reduce the durability of the transferred image. As is understood by those skilled in the art this effect varies somewhat depending upon the properties of the pigment(s) and other components of the layer. Incorporating too much pigment will tend to yield a resultant image that is too soft and not sufficiently durable. Incorporating too little pigment will tend to yield a color layer that does not exhibit desired strength of color and which may not transfer well, yielding images of poor resolution and quality. Typically the pigment loading is optimized at low levels to achieve a desired balance of color and cohesive strength. In some instances, other materials will be incorporated into the composition to adjust the cohesive strength of the layer as desired.

Other optional additives which can be incorporated into the color layer include cosolvents, surfactants, defoamers, antioxidants, light stabilizers, e.g., hindered amine light stabilizers, ultraviolet light absorbers, biocides, etc. Surfactants can improve the dispersibility of the color agents in the binder prior to application of the color layer to a substrate, and can improve the coatability of the color layer.

Figure 4:
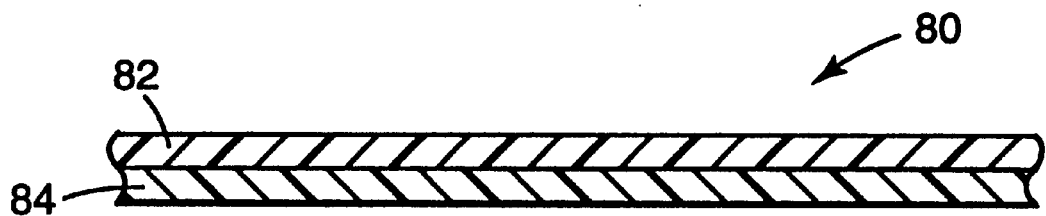
FIG. 4 is cross-sectional view of a thermal transfer article in accordance with the invention.

Thermal transfer articles of the present invention comprise a thermally mass transferable color layer comprising a dried version of a coatable composition described herein coated onto a carrier. An illustrative thermal transfer article 80 of the invention is illustrated in FIG. 4, consisting essentially of colorant layer 84 coated onto carrier 82, in this embodiment a thin polyethyleneterephthalate (PET) film. The color layer in thermal mass transfer articles of the invention is preferably from about 1 to 10 microns, more preferably from about 2 to about 8 microns, and most preferably from about 3 to about 6 microns thick. In some embodiments, the color layer has a softening or melting temperature between about 50° C. and about 140° C., more preferably between about 60° C. and about 120° C., and most preferably between about 70° C. and about 100° C. Color layers which are too thick may tend to undesirably increase the thermal conductivity of thermal transfer article 80 such that graphic resolution is impaired. Color layers which are too thin may tend to yield graphics which do not exhibit desired durability, hiding power, etc. Color layer 84 can be formed by known techniques, e.g., coating or printing.

In mass thermal transfer articles which employ a polymeric film carrier, the carrier is preferably from about 1 to about 10 microns, more preferably from about 2 to 6 microns, thick.

An optional anti-stick/release coating (not illustrated) is preferably coated onto the side of carrier 82 not having the color layer 84. Anti-stick/release coatings improve handling characteristics of the articles, reduce friction, and prevent the articles from sticking to the print substrate. Suitable anti-stick/release materials include, but are not limited to, silicone materials including poly(lower alkyl)siloxanes such as polydimethylsiloxane and silicone-urea copolymers, and perfluorinated compounds such as perfluoropolyethers.

In some instances an optional release liner (not shown) may be provided over color layer 84 to protect same during handling, etc.

Thermal transfer articles 80 of the invention are typically wound into roll form for shipping and handling and are typically sufficiently flexible to be wound around a 2.5 centimeter (1 inch) diameter core without cracking or breaking. In many instances, foils of the invention will be used to apply graphics to substantially planar surfaces, but if appropriate application equipment is used they can also be used to apply graphics to non-planar substrates.

Suitable carrier materials for thermal transfer articles of the invention provide means for handling the thermal transfer article and are preferably sufficiently heat resistant to remain dimensionally stable (i.e., substantially without shrinking, curling, or stretching) when heated to a sufficiently high temperature to achieve adherence of the adherence layer to the desired substrate. Also, the carrier preferably provides desired adhesion to the color layer during shipping and handling as well as desired release properties from the color layer after contact to the substrate and heating. Finally, the carrier and other components of the article preferably exhibit sufficient thermal conductivity such that heat applied in imagewise fashion will heat a suitable region of the color layer such that a graphic pattern of desired resolution is transferred. Suitable carriers may be smooth or rough, transparent or opaque, and continuous (or sheet-like). They are preferably essentially non-porous. By "non-porous" in the description of the invention it is meant that ink, paints and other liquid coloring media or anti-stick compositions will not readily flow through the carrier (e.g., less than 0.05 milliliter per second at 7 torr applied vacuum, preferably less than 0.02 milliliter per second at 7 torr applied vacuum).

Suitable carriers 12 can be selected by those skilled in the art. Illustrative examples of materials that are suitable for use as a carrier include polyesters, especially PET, (e.g., a sheet of MYLAR™ 23A Polyester from E.I. DuPont De Nemours Company), polyethylene naphthalate, polysulfones, polystyrenes, polycarbonates, polyimides, polyamides, cellulose esters, such as cellulose acetate and cellulose butyrate, polyvinyl chlorides and derivatives, aluminum foil, coated papers, and the like. The carrier generally has a thickness of 1 to 500 micrometers, preferably 2 to 100 micrometers, more preferably 3 to 10 micrometers. Particularly preferred carriers are white-filled or transparent PET or opaque paper.

The carrier should be able to withstand the temperature encountered during application. For instance, MYLAR™ polyester films are useful for application temperatures under 200° C. with other polyester films being preferred for use under higher temperatures.

Depending upon the characteristics of the carrier and color layer an optional intermediate release control layer may be desired. Suitable release control layers may be selected to provide the desired adhesion and release characteristics between the carrier and color layer and may be readily selected by those skilled in the art. Illustrative examples of typically suitable materials include wax or lacquer. Typically, release control layers will be relatively thin, e.g., about 0.1 micron or so.

Color layer 84 is selected to provide desired adhesion and release from carrier 82, or, if used, the release control layer, and desired adhesion to the intended substrate. Color layer 84 also essentially defines the appearance of the resultant graphic and is formulated to provide the desired color. The color layer is formulated as described above. Color layer 84 may be made up of an essentially homogenous or uniform layer of desired color, or may be segmented with two or more different colors if desired. Color layer 84 and carrier 82 are typically coextensive with one another but the carrier may be substantially continuous and the color layer made up of discontinuous segments if desired.

Coating of the coatable, film-forming thermal transfer precursor compositions of the invention onto the carrier may be accomplished by many standard web coating techniques such as imprint gravure, single or double slot extrusion coating, and the like. Imprint gravure is particularly useful for patch-type coatings in which there are interspersed regions of opaque white or metal colorants on a ribbon or sheet. Suitable preparation techniques will depend in part on the nature of thermal transfer article which is desired and can be readily selected by those skilled in the art in accordance with the present invention.

Thermal transfer articles of the invention are suitable for image production in desktop publishing, direct digital non-critical color proofing, short and long run sign manufacture, and so forth. Crosslinking such as in the present invention is especially desirable when the graphic image is intended to be weatherable and durable. As used herein the terms durable and durability refer to characteristics such as solvent and chemical resistance, ultraviolet light resistance, abrasion resistance, bond maintenance of the color layer to the print substrate, and maintenance of color brightness and (for retroreflective substrates) retroreflective brightness. The terms weatherable and weatherability refer to the characteristics such as maintenance of retroreflective brightness, resistant to dirt, resistance to yellowing and the like, all of these in normal use conditions in the outdoors, where sunlight, temperature, and other environmental parameters may affect performance.

Figure 5:
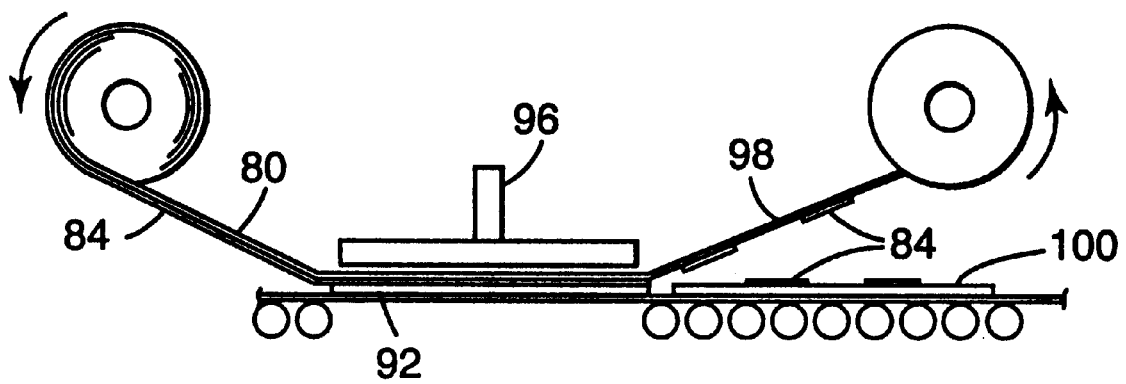
FIG. 5 is a schematic of an inventive thermal mass transfer method.

FIG. 5 illustrates schematically a method of the invention for producing a graphic article of the invention using the thermal transfer articles of the invention. Substrate 92 and thermal transfer article 80 are contacted in thermal transfer printing device 96. Color layer 84 of article 80 contacts substrate 92 in device 96 in a desired pattern to form a signage precursor. Many thermal transfer printing devices are known and may be used in this process. One such apparatus is that known under the trade designation ZEBRA™ 140, available from ZEBRA Technologies Corp., of Chicago, Ill. Thermal transfer article 80 and substrate 92 move simultaneously past a print station comprising a print head that applies heat and contact or pressure to produce a substrate with transferred indicia 100. Spent thermal transfer article 98 may then be wound up on a take-up roll (not shown). If a high durability graphic article is not desired, article 100 may simply be used as is or stored without further treatment. However, if higher performance is desired, graphic article 100 can be treated, e.g., exposed to heat to induce crosslinking. As noted in the examples, when a covalent crosslinking agent such as melamine is included in the color layer of thermal transfer article, at least some crosslinking can occur in thermal transfer printer, as evidenced by solvent resistance tests.

Printed graphic articles of the invention may pass through a cutting station, such as when vehicle identification tags and the like are to be produced. The person skilled in the retroreflective signage art will recognize other variations of the method, such as image definition provided by a computer, which signals the print head to print the desired indicia.

With alkyl/acrylic thermoplastic binder materials within general formula (I) it may be useful to incorporate a separate covalent crosslinking resin, i.e., a resin having moieties reactive with pendant carboxylic acid groups on the alkyl/acrylic polymers within general formula (I). Such a resin is inactive in the composition when formulated and remains inactive until it is desired to covalently crosslink the binder in the color layer. Crosslinker resins that can be thermally activated include melamine-formaldehyde resins, urea-aldehyde resins, phenol-aldehyde resins, polyamines, epoxies, and polyalkyleneimines such as polyethyleneimine. Illustrative examples of suitable thermally activated latent crosslinker resins are RESIMENE™ AQ7550 (an aqueous solution containing 78 to 80 parts methylated melamine formaldehyde and 20 to 22 parts water) from Monsanto, St. Louis, Mo., and CYMEL™ 385, from American Cyanamid. In compositions of the invention cured via thermal energy the compositions typically and preferably comprise from about 1 to about 20 parts by weight (solids basis) of a crosslinker resin. Thermally activatable latent crosslinkers useful in the invention are generally activated at a temperatures ranging from about 80° C. to about 150° C., preferably 80° C. to about 140° C., more preferably from about 115° C. to about 130° C. An advantage of thermal crosslinking is that partial crosslinking can, if desired, take place in the same step as the thermal transfer application of the color layer to the substrate surface.

An advantage of thermal transfer articles of the present invention is that they may be used to form graphic patterns on retroreflective sheetings and other substrates with face comprising olefin-based materials or polyurethane-based coatings. For instance, hot stamping foils of the invention may be used to great advantage to provide graphic patterns on cover films or faces that comprise ethylene/acrylic acid copolymer. If desired, hot stamping foils of the invention may be used to provide graphic patterns on substrates to which no priming treatment has been applied.

Retroreflective graphic articles of the invention may be applied to many structures. The structures may be flat or have compound, contoured three dimensional surfaces. For application to these latter complex surfaces, the graphic article needs to be sufficiently flexible to conform thereto without delaminating or lifting off. The actual requisite flexibility will depend in large part on the nature of the structure surface.

A particularly useful embodiment of graphic articles of the invention is as license plate sheeting, e.g., which can be adhered to a substrate such as a conventional aluminum license plate blank or a clear polycarbonate front face. In many license plate sheetings of the invention, a color layer is disposed between and in direct contact with a cover film and a base layer, e.g., graphic pattern 22 is disposed between cover film 20 and base sheet 12 as illustrated in FIG. 1. If desired, the surface of the base layer can comprise polyvinyl butyral or urethane-extended polyester. If desired, the cover film can comprise ethylene acrylic acid copolymer. Retroreflective base sheets made with such materials are currently known but cannot be used with some previously known inks and thermally transferred color layers. Color layers of the present invention provide desired adhesion thereto. An advantage of the present invention is that the inks (and thermally transferable color layers produced therewith) provided herein provide good adhesion to such materials without the use of an intermediate priming layer, i.e., the graphic pattern is in direct contact with both the cover film and the base sheet, especially in instances where the color layer is coextensive with the base sheet and cover film. In some instances, e.g., where the color layer is not coextensive with the cover film and the base sheet but is imagewise, e.g., an alphanumeric legend or other graphic image, it may be desired to use prime treatments such as corona treatment, e.g., using air, carbon dioxide, nitrogen, oxygen, or mixtures, of the base sheet and/or cover film to achieve desired inter-ply adhesion.

In other embodiments, the color layer is left exposed on the outer surface of the retroreflective base sheet, e.g., graphic pattern 24 in FIG. 1. In some instances, it may be desired to use a prime material such as one of the NEOREZ™ Brand Dispersions, a line of aqueous colloidal urethane dispersions from Zeneca Resins.

If desired, the color layer may be applied so as to be coextensive with or cover the retroreflective base sheet to impart desired color across the entire article. Alternatively, the color layer may be applied in imagewise fashion, e.g., to form a legend on a license plate.

Many new high performance retroreflective sheetings are made with cover films made of such materials as ethylene/acrylic acid copolymer. An advantage of the present invention is that the inks discussed herein can be applied to surfaces comprising such materials as vinyl acid copolymer or urethane-primed vinyl acid copolymer, e.g., ethylene/acrylic acid copolymer, ethylene-methacrylic acid copolymer, and ionically-crosslinked copolymers thereof (for instance SURLYN™ Polymers from E.I. duPont de Nemours).

An advantage of the present invention is that the thermally transferable color layers described herein can be used to make retroreflective graphic articles that are substantially free of halogenated polymers such as polyvinyl chloride, thereby eliminating the environmental risks associated with such materials.

If desired, the copolymeric binder material described herein can be used as a tie layer material within a retroreflective sheeting. For example, continuous layer 22 in FIG. 1 or continuous layer 58 in FIG. 2, formulated without colorant if desired may be used to more securely bond the constructions together.

EXAMPLES

The invention will be further explained by the following illustrative examples which are intended to be non-limiting. Unless otherwise indicated, all amounts are expressed in parts by weight.

Test Methods

The following test methods may be used to evaluate the utility of retroreflective graphic articles of the invention in certain outdoor environments, especially in conjunction with motor vehicles. A graphic article that fails to pass every test may still be suitable for outdoor use, depending upon the requirements for a specific application. Unless otherwise noted below, a graphic article is considered to have passed a particular test if it shows no objectionable effect, e.g., including surface deterioration, gloss or color change, adhesion loss, and cracking or crazing.

In each test, the graphic article was bonded to an aluminum panel with a pressure-sensitive adhesive, using care to squeeze out all of the air between the article and the panel. A 2 inch (5 centimeter) hand roller was used to facilitate such smooth lamination. After lamination of the graphic article thereto, panels were allowed to age for 24 hours at room temperature (65° F. to 75° F., 18° C. to 24° C.) prior to analysis, which was also at room temperature.

Surface Adhesion

Adhesion of external color layers to retroreflective substrates was evaluated in a procedure analogous to ASTM 3359. A first series of parallel lines about 1 to 2 millimeters apart were scored in the surface of the graphic article, extending through the thickness of the color layer to or into the underlying layer, and a second series of similar parallel lines was then scored perpendicular to the first series. 3M Brand Olive Drab Cloth Tape No. 390 was then firmly adhered to the cross hatched area and then removed in a single, rapid continuous motion at about 90° to the panel. The panel was then examined and the percent of remaining color layer determined to assess adhesion. Samples were rated from 0B to 5B as specified in ASTM 3359, according to the amount of ink removed. A rating of 5B is preferred.

Abrasion Resistance

Abrasion resistance was evaluated using the "falling sand" test described in ASTM D968. Two liters of sand are dropped onto samples, the color layers examined, and the process repeated until the color layer had worn through to the retroreflective substrate. The number of liters of sand, up to a maximum of 12, was noted. Preferably the color layer will withstand abrasion by at least 6, more preferably 12 or more liters of sand.

Solvent Resistance

Resistance to indicated solvents was evaluated by moistening a paper towel with the indicated solvent and rubbing over the color layer with successive double rubs, stopping (recording the number of double rubs) when the color layer had been removed from the surface or when 100 double rubs was reached. A value of 100 means that little or no color layer had been removed from the surface and is considered a pass.

In Example 1, a color layer formulation which contained no crosslinker, was coated onto the base sheet to a nominal wet film thickness of 0.5 mil (12 microns) using a wire wound bar and allowed to dry at room temperature. In Example 2, a color layer formulation which contained a melamine crosslinking agent was coated and the graphic article prepared in the same way.

Example 1

A composition was prepared by mixing 50 grams of a waterborne EAA dispersion known under the trade designation ADCOTE™ 50T4983, from Morton International, and 25 grams pigment dispersion known under the trade designation SUNSPERSE BLACK™, available from Sun Chemical, and 25 grams of water. The ink was coated onto a PET film carrier to give a wet film thickness of about 0.5 mil (about 13 micrometers). The ink was then dried at room temperature (about 20° C.), thus yielding a thermal transfer article of the invention.

One day later, the thermal transfer article was loaded into an Utsch hot stamp machine operating at 200° C., 5 to 6 feet/minute, rubber roll hardness 65 to 80 shore, and the color layer transferred imagewise onto the embossed or raised areas of a license plate with a piece of an enclosed lens retroreflective sheeting having an extruded EAA cover film as described in U.S. Pat. No. 4,664,966.

The transferred color layer had good adhesion to the retroreflective sheeting, as demonstrated by the surface adhesion test. Resistance to methyl ethyl ketone (MEK) and gasoline was poor, with results of 15 and 6 double rubs, respectively, obtained in the solvent resistance test. Results of the abrasion resistance test were 12 L (12 liters of sand).

Example 2

An ink and thermal transfer article were prepared as in Example 1 using 40 grams ADCOTE™ 50T4983, 25 grams of SUNSPERSE BLACK™, 25 grams of water, and 5 grams of a waterborne melamine-formaldehyde resin known under the trade designation AQ7550™, available from Monsanto Corp. The color layer of the thermal transfer article was transferred and tested in the same manner as in Example 1.

The transferred color layer again exhibited good adhesion to the EAA cover film of the retroreflective sheeting, as demonstrated by the surface adhesion test. Results of the solvent resistance tests were improved over the sample of Example 1, with a value of 25 double rubs obtained for both MEK and gasoline. The retroreflective sheeting having the transferred color layer was placed into an oven at 250° F. (121° C.) for 10 minutes, and then again subjected to the solvent resistance tests. For both the MEK and gasoline, the color remained on the retroreflective sheeting after 100 double rubs. This process was repeated with samples aged 21 days, with good transferability and improved solvent resistance after the oven cycle, demonstrating the shelf stability of the crosslinkable color layer.

Examples 1 and 2 demonstrated the surprising result that thermal transfer articles of the invention have shelf stability, since it would have been expected that the color layer would not have remained thermally transferable. Further, the color layer of the thermal transfer article was crosslinkable after thermal transfer, demonstrated by the improved solvent resistance of the transferred color layer after a post-transfer cure. Also, the color layer may be crosslinked in the thermal transfer step, indicated by the slightly improved solvent resistance of the transferred color layer of the high performance article before oven exposure, compared with the solvent resistance of the thermal transfer article of Example 1.

Various modifications and alterations of this invention will become apparent to those skilled in the art without departing from the scope and spirit of this invention.

What is claimed is:

1. A thermally-crosslinkable thermoplastic composition comprising a dispersion of a color agent and a latent crosslinker in a copolymeric binder, said binder comprising the copolymerization product of an olefinic monomer and a second monomer having a pendant carboxyl group, the binder having the general formula:

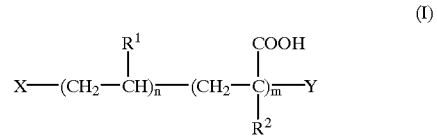

(I)

wherein $R^1$ is independently hydrogen or an alkyl group containing one to eight carbon atoms; $R^2$ is H, an alkyl group containing one to six carbon atoms, —CN, an ester group, or —$R^3$—COOH wherein $R^3$ is any alkyl group; X and Y are independently a residue of the olefinic monomer or a residue of the second monomer; n is a number selected such that the olefinic monomer provides 70 to 99 mole percent of the binder; and m is a number selected such that the second monomer correspondingly provides 1 to 30 mole percent of the binder; the formula including basic salts thereof.

2. The composition of claim 1 wherein said olefinic monomer is ethylene and said second monomer is either acrylic acid or methacrylic acid.

3. The composition of claim 1 wherein said copolymeric binder is blended or supplemented with a secondary binder.

4. The composition of claim 3 wherein said secondary binder is an acrylic, styrenated acrylic, or polyurethane polymer.

5. The composition of claim 1 wherein said crosslinker is a covalent crosslinker.

6. The composition of claim 1 wherein said crosslinker is selected from the group consisting of melamine formaldehyde resins, carbodiimides, epoxies, and oxazolines.

7. The composition of claim 6 wherein said crosslinker is a melamine formaldehyde resin.

* * * * *